United States Patent [19]

Zeth et al.

[11] Patent Number: 4,603,960

[45] Date of Patent: Aug. 5, 1986

[54] METHOD FOR AND APPARATUS FOR DETERMINING AN OPTIMUM GRADATION PARAMETER FOR DEVELOPING AERIAL PHOTOGRAPHS

[75] Inventors: Ulrich Zeth; Heinrich Klose; Günther Voss; Peter Winkler, all of Jena, German Democratic Rep.

[73] Assignee: Jenoptik Jena G.m.b.H., Jena, German Democratic Rep.

[21] Appl. No.: 666,398

[22] Filed: Oct. 30, 1984

Related U.S. Application Data

[63] Continuation-in-part of Ser. No. 340,489, Feb. 16, 1982, abandoned.

[30] Foreign Application Priority Data

Apr. 2, 1981 [DD] German Democratic Rep. ... 229118

[51] Int. Cl.⁴ .......................... G03B 7/08; G03B 39/00
[52] U.S. Cl. ....................................... 354/432; 354/65
[58] Field of Search ................... 354/23 D, 31, 65, 66, 354/72, 105, 106, 109, 20, 410, 429, 432

[56] References Cited

U.S. PATENT DOCUMENTS

| | | | |
|---|---|---|---|
| 4,047,187 | 9/1977 | Mashimo et al. | 354/31 |
| 4,214,826 | 7/1980 | Uchida et al. | 354/31 |
| 4,217,046 | 8/1980 | Weinstein et al. | 354/106 |
| 4,309,091 | 1/1982 | Fukuhara et al. | 354/72 |
| 4,364,650 | 12/1982 | Terasita et al. | 354/31 |
| 4,394,078 | 7/1983 | Terasita | 354/31 |
| 4,395,099 | 7/1983 | Terasita | 354/31 |

Primary Examiner—Russell E. Adams
Attorney, Agent, or Firm—Jordan and Hamburg

[57] ABSTRACT

A method and apparatus for determining an optimum development parameter, particularly for use in developing aerial photographs, in which the entire brightness of terrain objects to be imaged is converted into corresponding density values which are used in developing an aerial photograph. The method comprises the steps of detecting a terrain brightness by means of a photodetector array, processing the obtained measuring values in selecting maximum and minimum values, subjecting the latter values to a smoothing operation and determining a relevant gradation value. The gradation value is displayed and/or stored and used in the development of the exposed film material, taking into consideration the respective parameters.

6 Claims, 1 Drawing Figure

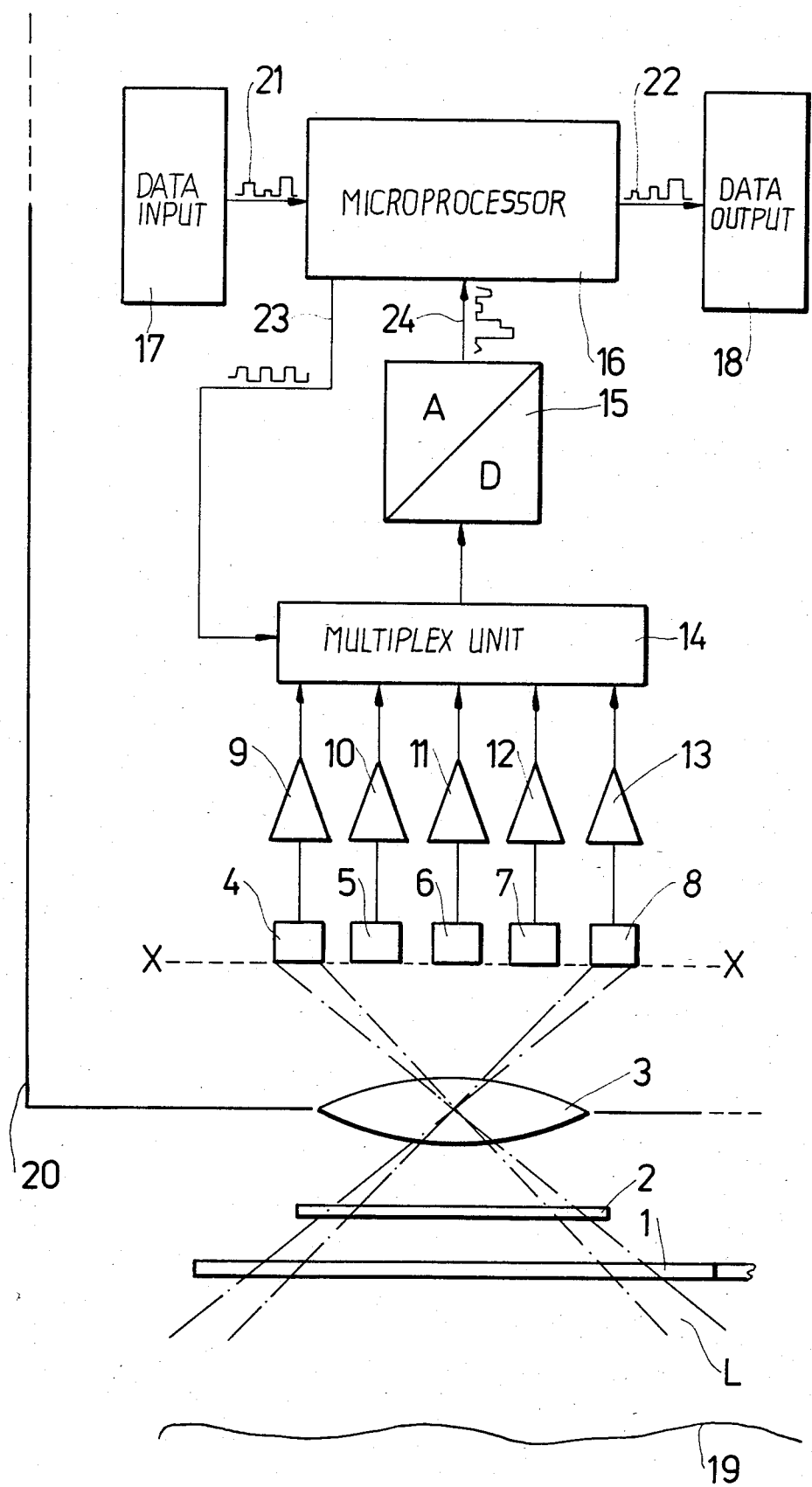

METHOD FOR AND APPARATUS FOR DETERMINING AN OPTIMUM GRADATION PARAMETER FOR DEVELOPING AERIAL PHOTOGRAPHS

This application is a continuation-in-part of application Ser. No. 340,489, filed on Feb. 16, 1982, and now abandoned.

This invention relates to a method and apparatus for detecting an optimum development parameter, particularly for use in exposing and developing aerial photographs, in which the entire brightness scale of an object to be imaged is converted into corresponding density values of a photo negative.

BACKGROUND OF THE INVENTION

Previous aerial cameras employ exposure meters and control units operating on an integral measuring principle, that is, a single photodetector is provided to detect the brightness of an entire terrain to be photographed.

In some applications the spectral sensitivity of the photodetector is adapted to the spectral sensitivity of a film material by using suitable means such as filters.

When color filters are used in the course of photographing a terrain, correction values are manually fed-in which are based on experience or taken from the operator's handbook delivered by the producer of a respective device. The integral measuring method is disadvantageous for the following reasons:

The measuring results are influenced by the random distribution of bright and dark areas in a terrain in the detection range of the photodetector; in particular, an overevaluation of the bright areas, which results from a logarithmic conversion of the brightness values into densities of the negative film, can involve an underexposure of dark areas at a particular distribution.

Furthermore, no information about the entire brightness of an object to be photographed can be obtained from the measuring values, due to the considerably wide detection angle of the detector. Therefore the operator's experience determines the selection of the optimum parameters for the film development in order to completely convert the brightness scale of an object in a terrain into respective discernable densities, that is, to eliminate over- and underexposures. Furthermore, when steep color wedges are used as filters to eliminate any atmospheric mist and, thus, to increase the contrast, the latter is not measurable by the integral measuring method.

In order to eliminate the above disadvantages, W. Komarek in "Modern Technology of Production of Aerial Photograph and Some New Devices Used in Aerial Photography" Int. Arch. Phm XVII Lausanne, 1968, proposed the use of exposure meters which differentially scan a swept terrain and which indicate both the minimum and the maximum brightness and, hence, deliver information which enables the operator to select optimum film exposure and development parameters. This solution has the disadvantage again that the experience of the operator plays the decisive part in determining the development parameters.

SUMMARY OF THE INVENTION

It is an object of the present invention to obviate the above disadvantages.

It is a further object of the present invention to provide an apparatus and method which permit an objectification of the development control for aerial photographs.

It is a further object of the present invention to automatically compute and indicate the development values from the brightness of an object to be photographed and the optimal density of a film material, thus eliminating under-and/or overexposure of aerial photographs of objects of a photographed terrain. These and other objects are realized in a method for detecting optimum development parameters for aerial photographs in which, by use of an array of photodetectors, a terrain is differentially scanned, the measuring values of the individual photodetectors being sensed after definite periods of time, the maximum and the minimum values of the measuring values of one measurement being detected and stored.

The sequence of the maximum values and the sequence of the minimum values are each subject to a smoothing operation and from the respective smoothed values the gradation required for a definite density for a photograph to be developed is indicated and/or recorded.

The gradation values can be additionally subjected to a further smoothing.

It is also feasible to obtain a mean value from a definite number of gradation values for further application in setting the optimal development values.

The method for selecting optimum exposure parameters is carried out by an arrangement described in more detail in connection with the following drawing.

BRIEF FIGURE DESCRIPTION

In order that the invention may be more readily understood reference is made to the accompanying drawing which illustrates diagrammatically and by way of example one embodiment thereof, wherein the sole FIGURE is a schematic view of an arrangement for carrying out the method for detecting an optimum development parameter.

DETAILED DESCRIPTION

An aerial camera includes a development value measuring unit in a common housing 20 for evaluating a terrain 19. An imaging beam L originating from the terrain 19 impinges upon a color filter 1 which also extends laterally in front of an aerial camera lens (not shown) which lies substantially in a common plane with a lens 3 of the exposure measuring unit at a spaced relation.

Said common plane and said color filter 1 are parallel to one another. A filter 2 is inserted in the imaging beam L between said lens 3 and said filter 1 in parallel with the latter.

An array of photodetectors comprised of individual photodetectors 4, 5, 6, 7, 8 having narrow detection angles is arranged in an imaging plane X-X of the lens 3. The outputs of the latter are connected to associated amplifiers 9, 10, 11, 12, 13 respectively which, in turn, are connected to a multiplexing unit 14. The multiplexing unit 14 may be comprised, for example, of CD 4016 or CD4066 Quad Bilateral CMOS switches (using a separate switch for each photodetector), the microcomputer 16 producing the control signals for the switches. The multiplexing unit 14 is connected via an analog-to-digital converter 15 to an input 24 of a microcomputer 16 which has two outputs 22, 23 and a further input port 21. (In the drawing, schematically represented at 21, 22 and 24 are digital signals with binary levels, i.e., there is no amplitude difference between the individual levels.) The microcomputer may be of any well known type, such as disclosed, for example, in "Microcomputer Systems Data Bank" Intel Corp., publication No. 98-4144, 1976, 1977; Microcomputer Systems Data Bank," Mostek Corp., publication No. 79781, 1980; "National Semiconductor Microcomputer Systems SMES 80/Data Bank," National Semiconductor Corp. DA-CP 30 M128, January 1979; "Z80-ECB-Serie"; Kontron Elektronik GmbH, Munich, 1979; and "780-Kit-Serie"; Kontron Electronic GmbH, Munich, 1979. Of course other conventional microcomputers may alternatively be employed.

A data input unit 17 is connected via the input port 21 to the microcomputer 16 which, via the output port 22 is connected to a data output unit 18 and, via the output port 23 to a clock-pulse input of the multiplexing unit 14.

The microcomputer 16 has further outputs (not illustated) connected to control an iris diaphragm (not shown) and an exposure stop (not shown) of the aerial camera.

In operation, light L from the terrain 19 passes through the filter 1 which has the same optical properties as corresponding filter extending in front of said aerial camera lens, and then through filter 2 which adapts the spectral sensitivity of the photodetectors to the film material used for the aerial photographs taken of said terrain 19.

The light beam L is focused on plane X-X, and, according to the light intensity and brightness, respectively, of said beam L depending on the brightness of the terrain 19, impinges on the respective photodetectors 4 to 8 to produce respective signals (currents) which are amplified in the amplifiers 9 to 13.

The multiplexing unit 14 samples the photodetectors 4 to 8 in dependence on the clock-pulse microcomputer (output 23) controlled by the microcomputer 16 according to a preselected period of time. The multiplexing unit 14 outlet signal is fed to the A/D converter 15 wherein the signals are converted into a digital measuring value and thereafter fed on output 24 to the microcomputer 16.

The data-input unit 17 feeds a control signal to port 21, corresponding to a density value Δs which represents the optimal density value of the film material used, to the microcomputer 16 to compute the gradation value γ.

The data-unit 17 may thus be a conventional manual input device, enabling an operator to apply a digital signal to the microcomputer corresponding to the optical density value of the film. For example, the input unit 17 may be composed of conventional switches, such as BCD switches for applying a selected parallel digitel signal to the microcomputer.

The information of the minimum brightness $E_{min}$ and of the maximum brightness $E_{max}$ and the Δs value are computed in the microcomputer 16 which determines the gradation γ according to the following formula:

$$\gamma = \frac{\Delta s}{lg\left(\frac{E_{max}}{E_{min}}\right)}$$

The above algorithm may be solved by the microcomputer employing any conventional language such as Pascal, C, Basic, etc., its solution per se hence being conventional.

Said gradation γ is the value for an optimum evaluation of an aerial photograph and is realized in the course of the development of the exposed film material in consideration of the necessary conditions such as developing time, developer, etc.

The microcomputer may be interfaced to the other elements of the system by any conventional technique. Suitable techniques are well known, and are disclosed, for example, in "Microprocessor Interfacing Techniques" Zaks and Lesen, Sybex, Berkeley Calif., 1977, and "Microcomputer Interfacing with the 8255 PPI Chip", Goldsbrough, Howard W. Sams and Co., Inc. Indianapolis, 1979.

Since, for economical reasons, the aerial photographs are not individually developed a gradation value is determined which ensures an optimum development of the information of all aerial photographs which are simultaneously developed. For this purpose the microcomputer 16 detects the maximum brightness signal $E_{max}^{(1)}$ obtained from the brightest terrain 19 objects and the minimum brightness signal obtained from the terrain 19 object of a minimum brightness $E_{min}^{(1)}$, from the signals from the photodetectors 4 to 8, and performs a smoothing operation of the maximum values $E_{max}^{(1)}$ and the minimum values $E_{min}^{(1)}$.

The smoothing operation ensures that the smoothed $E_{max}^{-(1)}$ is greater than the plurality of $E_{max}^{(1)}$ obtained from different terrain objects, however, as concerns the minimum value a plurality of the $E_{min}^{(1)}$ obtained from the different terrain objects are greater than the smoothed $E_{min}^{-(1)}$, where (1) is the clock-pulse cycle.

The smoothing operation may be effected by well known techniques, such as disclosed, for example, in "Handbuch der Physik" S. Fluegge, Bd. II, Springer-Verlag Heidelberg-Berlin-Goettingen 1955, pp 369–370; "Ausgleichsrechnung mit Anwendungen in der "Physik", E. Hultzsch, Akademische Verlaggesellschaft Geest and Portig K. G.; Leipzig, 1966, pp 115–119; and "Introduction to Numerical Analysis", F. B. Hildebrand, McGraw-Hill, NY., 1956, pp 256–302.

Thus a gradation value is determined which ensures an optimum information content of the developed photographs for a majority of photographs. At the same time any erroneous gradation values resulting from severely departing maximum and minimum values obtained from terrain objects strongly differing in brightness, and which could lead to a reduction of the contrast in developed photographs, are eliminated.

It is advantageous for the gradation values determined in the above manner to be subjected to a further smoothing operation in the microcomputer 16.

In an alternative step, the microprocessor 16 performs a mean value formation after definite periods of time with the gradation values obtained according to the above steps.

It is feasible to connect a printer or any other suitable data store to the data output unit 18 for storing the gradation values obtained in combination with data characterizing the aerial photography.

Thus it is feasible to cope with abruptly changing terrain details with strongly differing gradation values. The resulting respective aerial photographs which are identified by the output unit 18 or by the printer etc. can thereby be singled out, and the development of said singled out photographs individually developed under using the respective data.

It is further feasible in accordance with the invention to provide the microcomputer 16 with a further output connected to an aerial camera lens aperture control for feeding definite minimum brightness values obtained from the terrain 19 into said aperture control and to the exposure time control of said aerial camera. This procedure is well known, however, and does not in itself constitute a part of the present invention. Thus an underexposure of definite areas of said terrain 19 is eliminated.

We claim:

1. A method for determining an optimum gradation parameter for use in developing aerial photographs comprising the steps of adapting the spectral sensitivity of an array of photodetectors to that of a film material used, detecting brightness information of terrain objects at a plurality of points and converting said brightness informations into corresponding signals by said array of photodetectors, cyclically sampling said photodetectors at a preselected clock-pulse frequency to obtain measuring signals, selecting from a sequence of sampled measuring signals a maximum signal value E max indicative of a maximum brightness and a minimum signal value E min indicative of a minimum brightness of a sampling cycle, subjecting both the sequence of maximum signal values and the sequence of minimum signal values to a smoothing operation, and determining a gradation value $\gamma$ from said smoothed maximum and minimum signal values according to the relationship $$\gamma = \frac{\Delta s}{lg\left(\frac{E_{max}}{E_{min}}\right)}$$

for later use in a development of a film material exposed simultaneously with determining the respectively associated gradation value $\gamma$, wherein $\Delta s$ is the optimal density value of the film material.

2. The method of claim 1, comprising subjecting the smoothed gradation values $\gamma$ to a further smoothing operation.

3. The method of claim 1, comprising storing a mean value from a number of gradation values $\gamma$.

4. An apparatus for determining an optimum gradation parameter for use in developing aerial photographs taken from terrain objects comprising, in combination with an aerial camera, means for focusing brightness information from said terrain objects onto a focal plane, detecting means for detecting said brightness information, said detecting means being located in said focal plane, and converting means for converting said brightness information into corresponding electric signals, a multiplexing unit having first inputs and a control input and an output, said first inputs being connected to separate said detecting means wherein said first inputs are separately connected to said output under the control of signals at said second input, an a/d converter electrically connected to said output of said multiplexing unit, a first input of a microcomputer electrically connected to the output of said a/d converter, said microcomputer having a clock-pulse output and further outputs, and a second input, said clock-pulse output being electrically connected to said second input of said multiplexing unit, a data input unit, a data output unit, said data input unit and said data output unit being electrically connected to said microcomputer via said first microcomputer input and one of said further outputs, respectively, whereby said multiplexing unit samples said detecting means for producing sampled electric signals, and said a/d converter converts said sampled electric signals into digital signals, said data input unit being arranged to feed information about said film material to said microcomputer, said microcomputer comprising means to compute the gradation value $\gamma$, according to the relationship $$\frac{\Delta s}{lg\left(\frac{E_{max}}{E_{min}}\right)}$$

wherein $\Delta s$ is the optimal density of the film material received by said microcomputer via said data input, Emax and Emin are the maximum and minimum values respectively of said detected sampled and converted terrain brightness, from said detected sampled and converted terrain brightness information and said information about said film material, said data output unit being arranged to store computed signals, and means for adapting the spectral sensitivity of said detecting means to the spectral sensitivity of said film material, said means for adapting being arranged between said terrain and said focusing means adjacent said focusing means.

5. The apparatus of claim 4, wherein a printer is connected to one of said further outputs of said microcomputer.

6. The apparatus of claim 2, wherein a printer is connected to another of the further outputs of said microcomputer.

* * * * *